US010236759B2

(12) United States Patent
Abe et al.

(10) Patent No.: US 10,236,759 B2
(45) Date of Patent: Mar. 19, 2019

(54) STATOR STRUCTURE AND RESOLVER

(71) Applicant: MINEBEA MITSUMI INC., Nagano (JP)

(72) Inventors: Hiroshi Abe, Shizuoka (JP); Naohiro Yamada, Kanagawa (JP)

(73) Assignee: MINEBEA MITSUMI INC., Nagano (JP)

( * ) Notice: Subject to any disclaimer, the term of this patent is extended or adjusted under 35 U.S.C. 154(b) by 148 days.

(21) Appl. No.: 15/283,657

(22) Filed: Oct. 3, 2016

(65) Prior Publication Data

US 2017/0141663 A1   May 18, 2017

(30) Foreign Application Priority Data

Nov. 16, 2015 (JP) ................. 2015-223661

(51) Int. Cl.
| | |
|---|---|
| H02K 24/00 | (2006.01) |
| H02K 1/14 | (2006.01) |
| H02K 3/18 | (2006.01) |
| H02K 5/04 | (2006.01) |
| H02K 3/38 | (2006.01) |
| H02K 5/08 | (2006.01) |
| H02K 5/22 | (2006.01) |

(52) U.S. Cl.
CPC ............ *H02K 24/00* (2013.01); *H02K 1/14* (2013.01); *H02K 3/18* (2013.01); *H02K 3/38* (2013.01); *H02K 5/04* (2013.01); *H02K 5/08* (2013.01); *H02K 1/146* (2013.01); *H02K 5/225* (2013.01)

(58) Field of Classification Search
CPC .... H02K 3/32–3/38; H02K 5/04; H02K 5/08; H02K 24/00
See application file for complete search history.

(56) References Cited

U.S. PATENT DOCUMENTS

2015/0028862 A1   1/2015   Otobe

FOREIGN PATENT DOCUMENTS

| CN | 204103616 U | 1/2015 |
|---|---|---|
| JP | 2002-003664 A | 10/2002 |
| JP | 2003-209946 A | 7/2003 |
| JP | 2004-135402 A | 4/2004 |
| JP | 2009-148081 A | 7/2009 |

OTHER PUBLICATIONS

Chinese Office Action dated Jul. 26, 2018 for corresponding Chinese Application No. 201610803812.9 and English translation.

*Primary Examiner* — Ramon M Barrera
(74) *Attorney, Agent, or Firm* — Pearne & Gordon LLP

(57) ABSTRACT

A stator structure includes a stator unit, and first and second coil covers, the stator unit having: a stator core having a first main body portion with a plurality of through holes, and a plurality of teeth portions; and a coil, and the first and second coil covers covering the coil from a stator core axial direction; the first and second coil covers have first and second protecting portions and first and second engagement portions; each of the first and second protecting portions is arranged between the teeth portions; the first and second protecting portions arranged between the same teeth portions are in a non-restrained state, where their mutual movement in the axial direction is not restrained; their distal end portions overlap each other; and the first and second engagement portions are engaged with each other through the respective through holes.

7 Claims, 5 Drawing Sheets

STATOR STRUCTURE AND RESOLVER

CROSS-REFERENCE TO RELATED APPLICATION(S)

The present application claims priority to and incorporates by reference the entire contents of Japanese Patent Application No. 2015-223661 filed in Japan on Nov. 16, 2015.

BACKGROUND OF THE INVENTION

1. Field of the Invention

The present invention relates to a stator structure including coil covers, and relates, in particular, to a stator structure suitable for a resolver, and to a resolver.

2. Description of the Related Art

Resolvers are known as rotation angle sensors. For example, a resolver is formed of a stator core including teeth extending inwards to the center from an annular yoke portion and a rotor arranged opposite to the teeth portion of a stator inside the stator core. A winding wire is wound around the teeth via an insulator to form a coil. The winding wire is formed of an excitation winding wire for inputting excitation signals and two detecting winding wires for outputting two-phase signals according to rotation angle of the rotor. From the detecting winding wires, sine signals in the form of sin θ and cosine signals in the form of cos θ are output. A structure of a resolver is known, in which the structure has two coil covers attached to both sides of a stator core, the two coil covers covering a winding wire (coil) (see, for example, Japanese Patent Application Laid-open No. 2009-148081).

In the structure disclosed in Japanese Patent Application Laid-open No. 2009-148081, as illustrated in FIG. 7 and the like, a plurality of first support pillar portions and a plurality of first receiving portions are provided in the first coil cover, and a plurality of second support pillar portions and a plurality of second receiving portions are provided in the second coil cover. The first and second support pillar portions extend in spaces (slots) between teeth provided with an insulator. After the first and second coil covers are attached to the stator core, ultrasonic vibration is applied to positions where the second receiving portions of the second coil cover are provided, such that the first support pillar portions of the first coil cover and the second receiving portions of the second coil cover are welded to each other. Consequently, the first and second coil covers are joined to each other.

As a structure for joining two coil covers to each other, a structure has been known in which the structure uses a snap-fit between a locking projection and a locking stepped portion (see, for example, Japanese Patent Application Laid-open No. 2004-135402).

In a stator structure for a resolver, the stator structure disclosed in Japanese Patent Application Laid-open No. 2004-135402, the locking projection provided in the first coil cover penetrates a slot between teeth provided with an insulator, and engages with a cylindrical projection provided in the second coil cover, thereby joining the two coil covers together. After a locking claw of the locking projection penetrates by engaging with an annular tapered portion of the cylindrical projection, with the locking claw being deformed or distorted due to an expanding slot thereof, the locking claw is locked by the snap-fit with the locking stepped portion on a reverse side of the cylindrical projection.

In order to realize higher reliability in a stator of a resolver, arrival of foreign matter at a coil from an inner peripheral side of the stator needs to be prevented or reduced. Providing a protective structure covering an opening of a slot to the inner peripheral side of the stator is one method of realizing that. Such a protective structure may be realized, for example, by the support pillar portions and receiving portions, or the projections locking each other, which are described in the above cited Japanese patent applications.

However, since the support pillar portions and receiving portions, or the projections, of the above cited Japanese patent applications are also used as the structure for joining the two coil covers, upon the attachment of the coil covers, their mutual positional relation is fixed by the welding or locking. Therefore, if the welding or the locking is carried out when an error originated from the design is caused in the positions or sizes of the support pillar portions and receiving portions, or in the projections due to manufacture variation of the coil covers or the like; this error may result in distortion of the shape of the protective structure. The greater the number of the support pillar portions and receiving portions or of the projections, the greater the possibility and extent of such distortion will be. In this case, unintended gaps may be generated due to the distortion of the protective structure and foreign matter may enter the slots from the gaps. By this, reliability of the resolver may be deteriorated.

SUMMARY OF THE INVENTION

It is an object of the present invention to at least partially solve the problems in the conventional technology.

A stator structure according to an embodiment includes a stator unit, a first coil cover and a second coil cover. The stator unit includes a stator core which has a first main body portion and a plurality of teeth portions extending at an inner peripheral side of the first main body portion and in which a plurality of through holes are formed to penetrate between two principal surfaces of the first main body; and a coil formed of a winding wire wound around each of the plurality of teeth portions via an insulator. The first coil cover and the second coil cover cover the coil in an axial direction of the stator core. The first coil cover has a plurality of first protecting portions extending from a second main body portion and has a plurality of first engagement portions provided in the second main body portion. The second coil cover has a plurality of second protecting portions extending from a second main body portion and has a plurality of second engagement portions provided in the second main body portion. Each of the plurality of first protecting portions and each of the plurality of second protecting portions are arranged between the plurality of teeth portions. Each of the plurality of first protecting portions and each of the plurality of second protecting portions that are arranged between a same pair of the plurality of teeth portions are in a non-restrained state where, in the axial direction, movement of the each of the plurality of second protecting portions and the each of the plurality of first protecting portions, are not respectively restrained. Distal end portions of the plurality of first protection portions and the plurality of second protection portions overlap in a radial direction of the stator core. The plurality of first engagement portions and the plurality of second engagement portions are engaged with each other through the plurality of through holes.

The above and other objects, features, advantages and technical and industrial significance of this invention will be better understood by reading the following detailed descrip-

DETAILED DESCRIPTION OF THE PREFERRED EMBODIMENTS

Hereinafter, an embodiment of a stator structure and a resolver, according to the present invention, will be described in detail, with reference to the drawings. The present invention is not limited by this embodiment. Further, in the respective drawings, the same signs are appended, as appropriate, to the same or corresponding elements.

Embodiment

Figure 1:
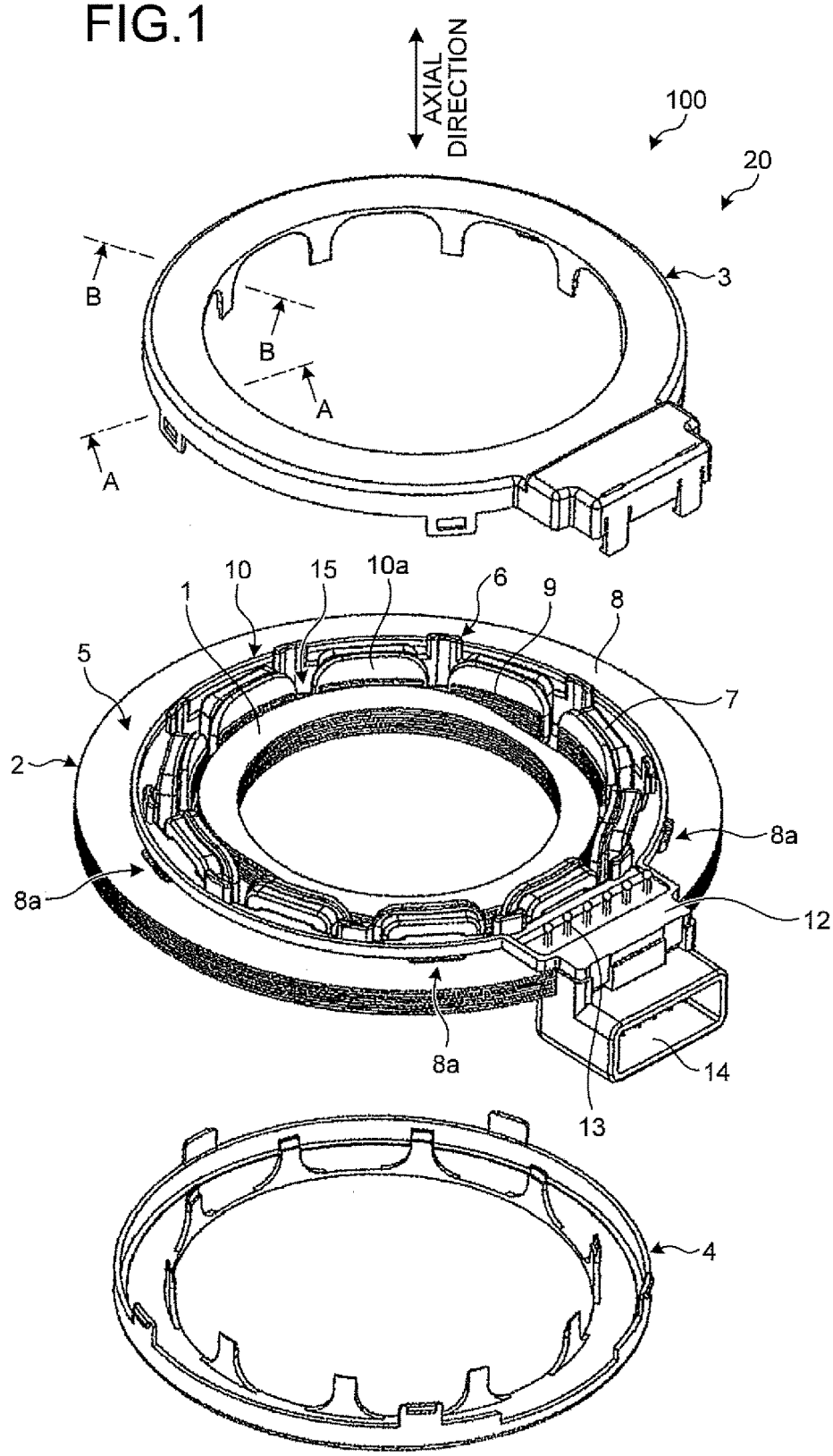
FIG. 1 is a schematic exploded perspective view of a resolver according to an embodiment.
Figure 2:
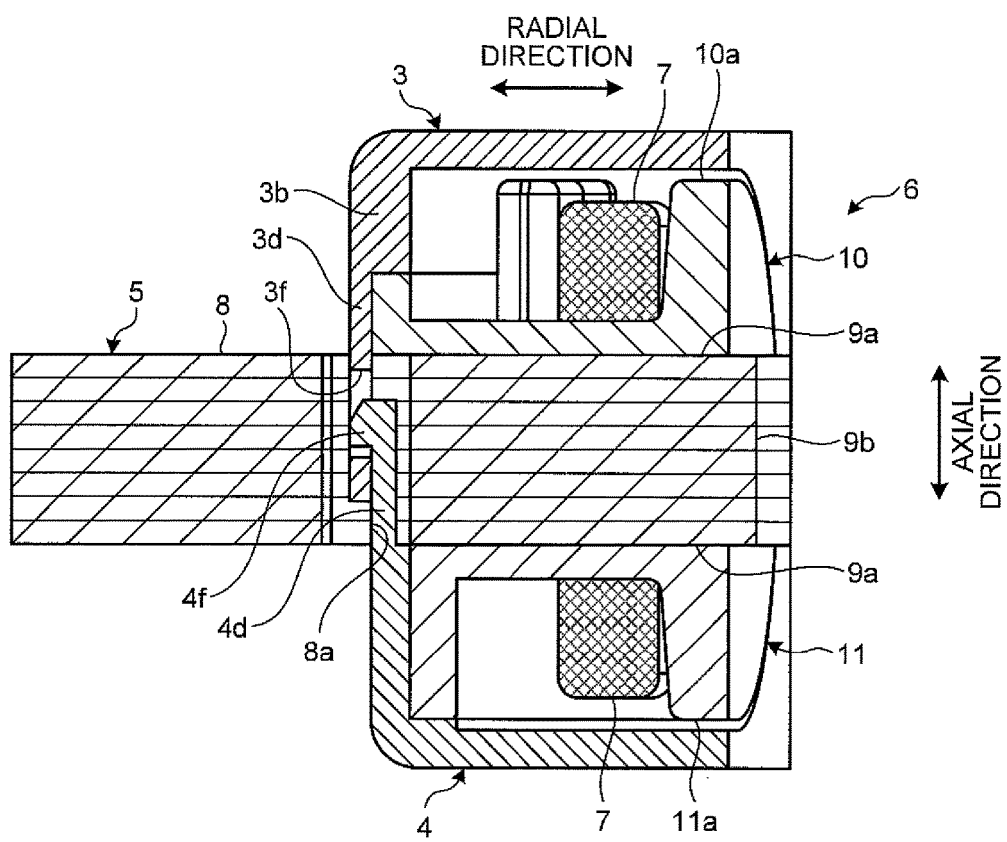
FIG. 2 is an A-A line cross sectional diagram of the resolver illustrated in FIG. 1.
Figure 3:
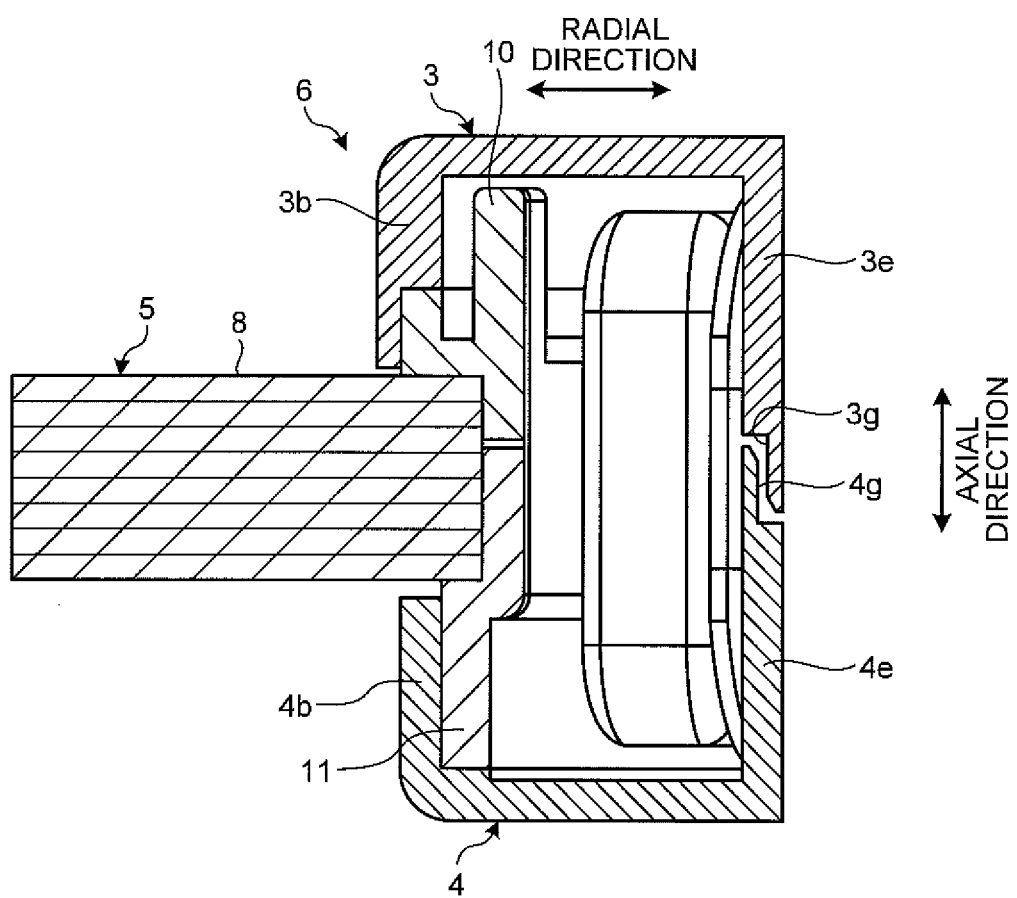
FIG. 3 is a B-B line cross sectional diagram of the resolver illustrated in FIG. 1.

FIG. 1 is a schematic exploded perspective view of a resolver according to an embodiment. FIG. 2 and FIG. 3 are an A-A line cross sectional diagram and a B-B line cross sectional diagram of the resolver illustrated in FIG. 1, respectively. As illustrated in FIG. 1 to FIG. 3, a resolver 100 is a variable reluctance (VR) type resolver, which includes a rotor 1, a stator unit 2, a first coil cover 3, and a second coil cover 4. The stator unit 2, the first coil cover 3, and the second coil cover 4 form a stator structure 20. That is, the resolver 100 includes the stator structure 20.

The rotor 1 has a layered structure having a plurality of steel sheets such as electromagnetic steel sheets layered over one another; is fitted to a rotation axis of a motor not illustrated; and is arranged inside the stator unit 2.

The stator unit 2 includes a stator core 5, an insulator 6, and a coil 7. The stator core 5 has a layered structure having a plurality of steel sheets such as electromagnetic steel sheets layered over one another; and has a first main body portion 8, which is ring-shaped, and a plurality of teeth portions 9 at an inner peripheral side of the first main body portion 8, the plurality of teeth portions 9 extending towards a center of the first main body portion 8. In this embodiment, the stator core 5 has ten of the teeth portions 9, but there is no limitation as to the number of the teeth portions 9. The teeth portions 9 are arranged at equal angular intervals in a circumferential direction of the first main body portion 8. Further, in the first main body portion 8, a plurality of through holes 8a are formed to penetrate between two principal surfaces of the first main body portion 8. The through hales 8a are positioned outer than a surface of the first main body portion 8, the surface where the later described insulator 6 is provided. In this embodiment, five of the through holes 8a are formed, but there is no limitation as to the number of the through holes 8a. Further, in this embodiment, the through holes 8a are arranged at equal angular intervals in the circumferential direction of the first main body portion 8. Hereinafter, an axial direction and a radial direction of the stator core 5 will be prescribed as illustrated in FIG. 1 to FIG. 3. The axial direction matches an axial direction of the rotation axis of the motor connected to the rotor 1, and the radial direction matches a direction orthogonally intersecting this axial direction.

The insulator 6 is made of resin that is an insulating material and is formed of a first insulator 10 and a second insulator 11. The first insulator 10 and the second insulator 11 are formed on surfaces of both sides of the stator core 5 in the axial direction. In particular, the first insulator 10 and the second insulator 11 are formed to cover four side surfaces 9a (see FIG. 2 and FIG. 6) of each of the teeth portions 9, and have protruding portions 10a and 11a which protrude in a direction intersecting (in this embodiment, in a direction orthogonally intersecting) the extending direction (radial direction) of each of the teeth portions 9 at a tip end surface 9b side of that teeth portion 9. The first insulator 10 and the second insulator 11 may be formed by injection molding of resin.

The coil 7 is formed by a winding wire wound around each of the teeth portions 9 via the first insulator 10 and the second insulator 11.

Further, the first insulator 10 includes a terminal block portion 12 extending outward in the radial direction of the stator core 5. In the terminal block portion 12, a plurality of (six, in this embodiment) terminals 13 are embedded; and a female connector housing 14 is also formed. The terminal block portion 12 may be formed simultaneously with the first insulator 10. One end of each of the terminals 13 is connected to a corresponding end of the winding wire forming the coil 7, and the other end of each of the terminals 13 protrudes inside the connector housing 14. The other end of each of the terminals 13 is connected to an external connector.

A space (slot) 15 is formed between the respective teeth portions 9. When the first coil cover 3 and the second coil cover 4 are not installed, this slot 15 communicates with inside of the stator core 5 through an opening between the protruding portions 10a and 11a of each of the teeth portions 9.

Next, the first coil cover 3 and the second coil cover 4 will be described. Although there is no limitation as to a material forming the first coil cover 3 and the second coil cover 4, in this embodiment, the first coil cover 3 and the second coil cover 4 are made of resin, and is formed by, for example, injection molding of the resin. For example, insulating resin may be used as the resin. The first coil cover 3 and the second coil cover 4 are attached to the stator unit 2 to cover the coil 7 of the stator unit 2 from both sides of the stator core 5 in the axial direction.

Figure 4:
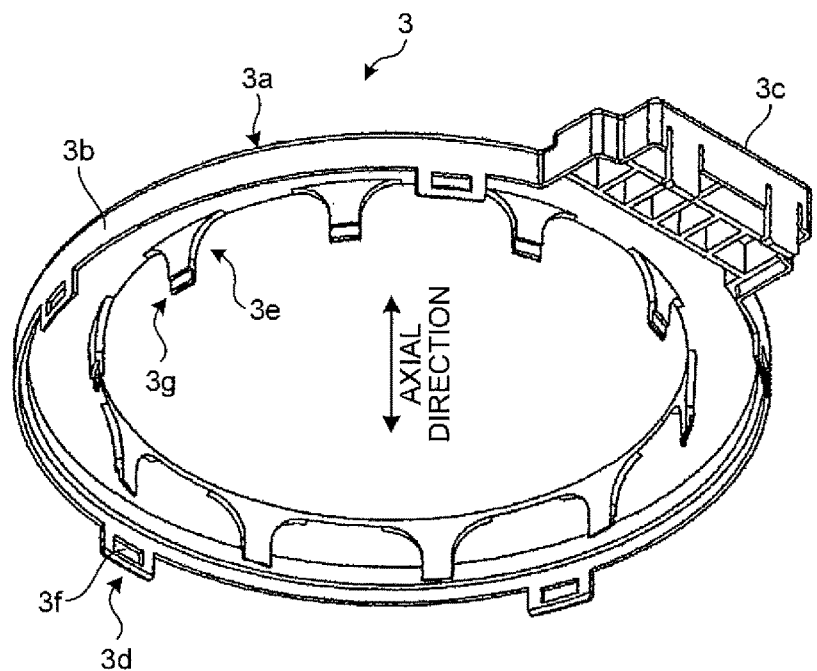
FIG. 4 is a schematic perspective view of a first coil cover.
Figure 5:
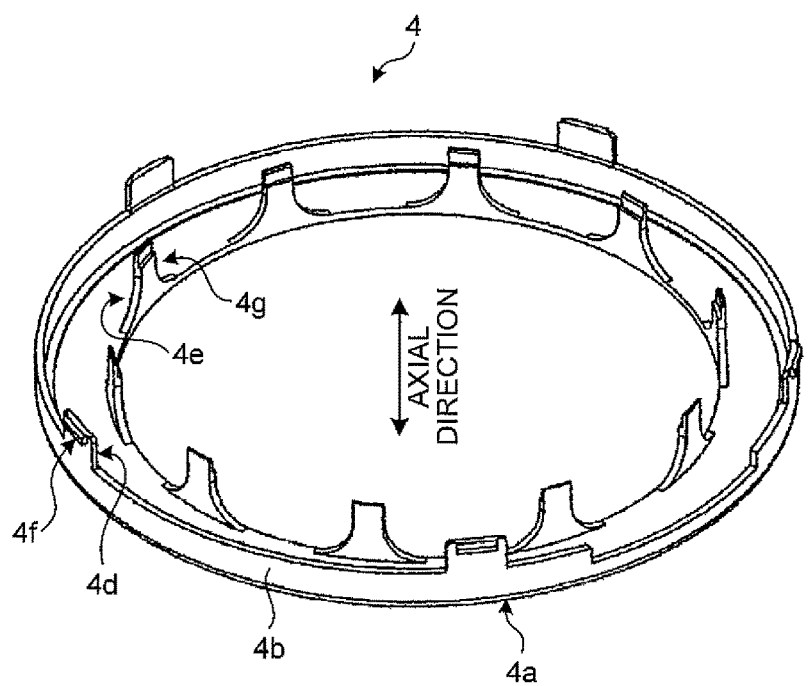
FIG. 5 is a schematic perspective view of a second coil cover.

FIG. 4 is a schematic perspective view of the first coil cover 3, and FIG. 5 is a schematic perspective view of the second coil cover 4. The first coil cover 3 has a second main body portion 3a, which is, as a whole, ring-shaped; and the second main body portion 3a includes, at an outer peripheral edge thereof, an outer peripheral wall 3b extending in the axial direction, and a terminal block cover portion 3c in a part of the outer peripheral wall 3b, the terminal block cover portion 3c covering the above described terminal block portion 12.

The first coil cover 3 includes a plurality of (five, in this embodiment) plate-shaped first engagement portions 3d, which are provided in the second main body portion 3a and extend in the axial direction from the outer peripheral wall 3b, and an opening 3f is formed at a distal end of the first engagement portion 3d. In this embodiment, the first engagement portions 3d are arranged at equal angular intervals in a circumferential direction of the first coil cover 3. Further, the first coil cover 3 includes a plurality of (ten, in this embodiment) plate-shaped first protecting portions 3e extending in the axial direction like the first engagement portions 3d, from an inner peripheral edge of the second main body portion 3a. In this embodiment, the first protecting portions 3e are arranged at equal angular intervals in the circumferential direction of the first coil cover 3. Further, the circumferential direction width of the first protecting portion 3e gradually increases towards the second main body portion 3a, and this will be described in detail later.

In the second coil cover 4, a second main body portion 4a is, as a whole, ring-shaped, and the second main body portion 4a includes, at an outer peripheral edge thereof, an outer peripheral wall 4b extending in the axial direction. An inner diameter and an outer diameter of the second main body portion 4a of the second coil cover 4 are substantially the same as an outer diameter and an inner diameter of the second main body portion 3a of the first coil cover 3.

Further, the second coil cover 4 includes a plurality of (five, in this embodiment) plate-shaped second engagement portions 4d, which are provided in the second main body portion 4a and extend in the axial direction from the outer peripheral wall 4b, and an engagement claw 4f is formed at a distal end of the second engagement portion 4d. In this embodiment, the second engagement portions 4d are arranged at equal angular intervals in a circumferential direction of the second coil cover 4. Further, the second coil cover 4 includes a plurality of (ten, in this embodiment) plate-shaped second protecting portions 4e extending in the axial direction like the second engagement portions 4d, from an inner peripheral edge of the second main body portion 4a. In this embodiment, the second protecting portions 4e are arranged at equal angular intervals in the circumferential direction of the second coil cover 4. Further, the circumferential direction width of the second protecting portion 4e gradually increases towards the second main body portion 4a, and this will be described in detail later.

When the first coil cover 3 and the second coil cover 4 are attached to the stator unit 2, the first coil cover 3 and the second coil cover 4 are brought closer to the stator unit 2 from both sides in the axial direction, each of the first protecting portions 3e of the first coil cover 3 is inserted between the protruding portions 10a of the teeth portions 9 and each of the second protecting portions 4e of the second coil cover 4 is inserted between the protruding portions lie of the respective teeth portions 9. Simultaneously therewith, the first engagement portions 3d of the first coil cover 3 and the second engagement portions 4d of the second coil cover 4 are inserted in the through holes 8a of the first main body portion 8 of the stator core 5, and the engagement claws 4f of the second engagement portions 4d are engaged with the openings 3f of the first engagement portions 3d through the through holes 8a (see FIG. 2).

Figure 6:
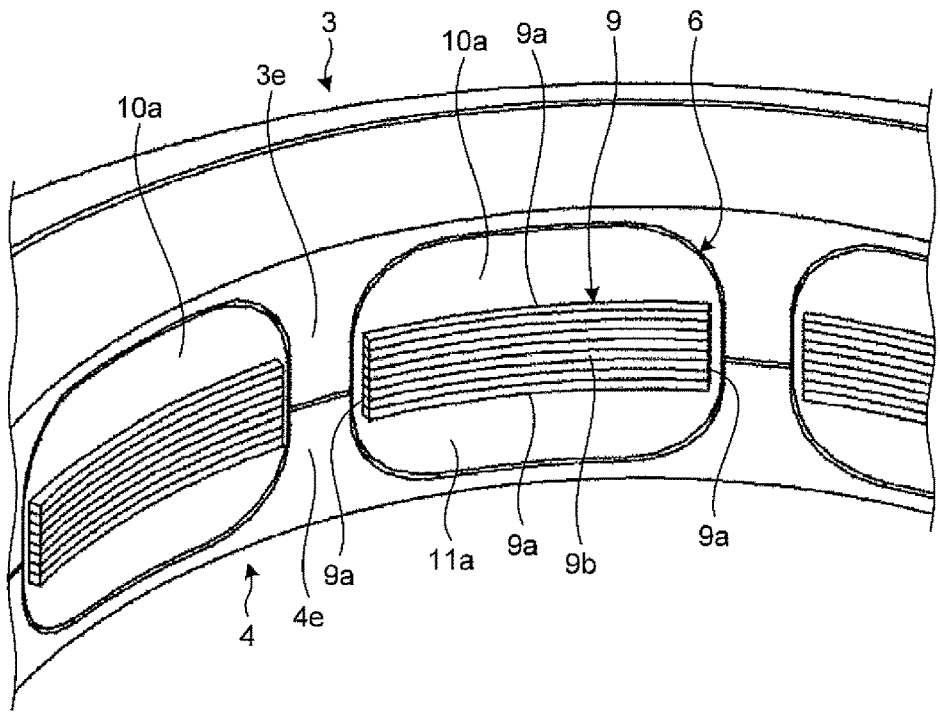
FIG. 6 is a diagram illustrating a first protecting portion, a second protecting portion, and protruding portions of an insulator.

Thus, the first coil cover 3 and the second coil cover 4 are joined together via the first engagement portions 3d and the second engagement portions 4d, respectively. Further, as illustrated in FIG. 6, each of the first protecting portions 3e and each of the second protecting portions 4e are arranged between the protruding portions 10a of the teeth portions 9 or between the protruding portions 11a of the teeth portions 9. Thereby, the slots 15 are closed from the inside of the stator core 5 by the first protecting portions 3e and the second protecting portions 4e.

The attachment of the first coil cover 3 and the second coil cover 4 to the stator unit 2 may be performed easily by the engagement between the engagement claws 4f and the openings 3f. Further, as illustrated in FIG. 2, in this embodiment, since the first engagement portions 3d and the second engagement portions 4d are engaged with each other inside the through holes 8a, the first coil cover 3 and the second coil cover 4 are difficult to be detached after the attachment.

By the attachment of the first coil cover 3 and the second coil cover 4 to the stator unit 2, the coil 7 and the terminal block portion 12 are covered. Thereby, since the coil 7, and the winding wires forming the coil 7 and the terminal block portion 12 are not exposed; the coil 7, and the winding wires forming the coil 7 and the terminals 13 are prevented from being damaged.

As illustrated in FIG. 6, each of the protruding portions 10a and 11a has a semi-elliptical outer shape, and joining the protruding portions 10a and 11a together forms an elliptical outer shape. Further, as described above, the circumferential direction widths of each of the first protecting portions 3e and each of the second protecting portions 4e gradually increase toward the second main body portion 3a or 4a. Consequently, the first protecting portions 3e and the second protecting portions 4e have outer shapes along the outer shapes of the respective protruding portions 10a or 11a. As a result, gaps between the first protecting portions 3e or second protecting portions 4e, and the protruding portions 10a or 11a, may be narrowed.

Further, as illustrated in FIG. 3 to FIG. 5 also, stepped portions 3g and 4g, which face each other in the radial direction of the stator core 5 and form steps, are formed at distal end portions of each of the first protecting portions 3e and each of the second protecting portions 4e. Thereby, the stepped portions 3g and 4g are arranged in a mutually nested state, and thus, the first protecting portion 3e and second protecting portion 4e, which are arranged between the same teeth portions 9 and correspond to the same slot 15, are separated from each other by a slight gap and overlap each other in the radial direction of the stator core 5.

As described above, the distal end portions of each of the first protecting portions 3e and each of the second protecting portions 4e overlap each other in the radial direction of the stator core 5. Therefore, this overlapped part is structured such that the slot 15 cannot be seen directly from an inner peripheral side of the stator core 5. As a result, while the first protecting portions 3e and the second protecting portions 4e are slightly separated from each other with gaps therebetween, entry of foreign matter into the slots 15 from the inner peripheral side of the stator core 5 is reduced or prevented. Further, since the stepped portions 3g and 4g make the gaps labyrinth-like, the effect of reducing or preventing the entry of foreign matter is even more increased.

Furthermore, since the first protecting portions 3e and the second protecting portions 4e are separated from each other slightly, even if force is respectively applied in mutually facing directions in the axial direction, the first protecting portions 3e and the second protecting portions 4e are in a non-restrained state where their mutual movements (i.e. movement of the second protecting portions 4e and movement of the first protecting portions 3e, respectively) in the axial direction are not restrained. This means that even if there is an error from the design in positions or sizes of the first protecting portions 3e and the second protecting portions 4e, the mutual movement of the first protecting portions 3e and second protecting portions 4e in the axial direction is not respectively restrained, until the first engagement portions 3d and the second engagement portions 4d are respectively engaged with each other and when the first engagement portions 3d and the second engagement portions 4d are respectively engaged with each other. As a result, occurrence of a state where stress is applied to the first protecting portions 3e and the second protecting portions 4e and the first protecting portions 3e and the second protecting portions 4e are respectively distorted, due to restraint of the mutual movement of the first protecting portions 3e and the second protecting portions 4e in the axial direction, is reduced or prevented. Thereby, the state where the gaps between the first protecting portions 3e or the second protecting portions 4e, and the protruding portions 10a or 11a are respectively narrow, is maintained. As a result, entry of foreign matter from these gaps into the slots 15 is also reduced or prevented. The intervals separating the first protecting portions 3e and the second protecting portions 4e from each other are preferably designed, in consideration of manufacturing errors in dimensions of components forming the resolver 100, design tolerance, or extent of expansion or contraction due to heat under the temperature environment in which the resolver 100 is used.

Since entry of foreign matter into the slots 15 is reduced or prevented by the inclusion of the stator structure 20 having the above described configuration, the resolver 100 according to this embodiment is a resolver having higher reliability.

Other Forms of First Protecting Portions and Second Protecting Portions

At distal end portions of the first protecting portions 3e and the second protecting portions 4e, respectively, the stepped portions 3g and 4g forming the steps facing each other in the radial direction of the stator core 5 are formed. However, a form of the first protecting portions and the second protecting portions is not limited to that of the embodiment.

Figure 7:
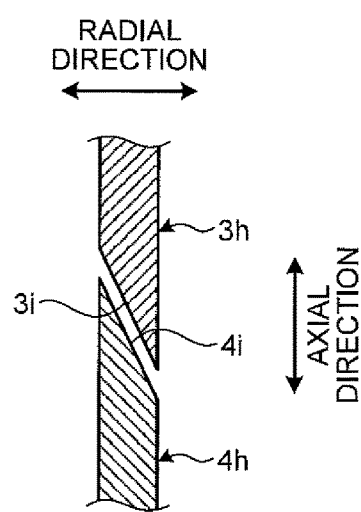
FIG. 7 is a diagram illustrating another form of the first protecting portion and second protecting portion.

FIG. 7 is a diagram illustrating another form of the first protecting portions and the second protecting portions. At respective distal end portions of plate-shaped first protecting portion 3h and second protecting portion 4h illustrated in FIG. 7, inclined surfaces 3i and 4i facing each other in the radial direction of the stator core 5 are formed. Further, the first protecting portion 3h and the second protecting portion 4h are slightly separated from each other. Furthermore, the first protecting portion 3h and the second protecting portion 4h have outer shapes along the outer shapes of the respective protruding portions 10a and 11a. For the first protecting portion 3h and the second protecting portion 4h having such a form also, even if force is applied respectively in mutually facing directions in the axial direction, they are in a non-restrained state where their mutual movements (i.e. movement of the second protecting portion 4h and movement of the first protecting portion 3h, respectively) in the axial direction are not restrained, and distal end portions overlap each other in the radial direction of the stator core 5; and thus entry of foreign matter into the slot 15 is reduced or prevented, and a resolver having higher reliability is realized.

The inclined surfaces 3i and 4i of the first protecting portion 3h and the second protecting portion 4h may contact each other. In this case, when force is applied in the mutually facing directions in the axial direction to the first protecting portion 3h and the second protecting portion 4h respectively, they slide along each other at the inclined surfaces 3i and 4i, and thus their mutual movement in the axial direction is not restrained. Further, since plate thicknesses of the first protecting portion 3h and the second protecting portion 4h are as thin as, for example, about 1 mm, even if the first protecting portion 3h and the second protecting portion 4h are shifted from each other in the radial direction, the amount of that shift is extremely small and distortion is hardly caused.

A form of the first protecting portions and second protecting portions is not limited to the form according to the above described embodiment; as long as the first protecting portion and the second protecting portion arranged between the same teeth portions are in a non-restrained state where their mutual movement (i.e. movement of the second protecting portion and the first protecting portion) in the axial direction are not restrained, and their distal end portions overlap each other in the radial direction of the stator core.

Further, in the above described embodiment, the first engagement portions 3d and the second engagement portions 4d are engaged with each other inside the through holes 8a, but the present invention is not limited to this embodiment, and may have a configuration, in which the first engagement portions 3d and the second engagement portions 4d are engaged with each other outside the through holes 8a via the through holes 8a. If the first engagement portions and the second engagement portions are configured to engage with each other outside the through holes via the through holes, for example, the first engagement portion may be formed by an opening or a concave portion being directly provided in the second main body portion of the first coil cover, and the second engagement portion may be configured to penetrate the through hole such that the engagement claw at a distal end thereof engages with the opening or concave portion of the first engagement portion. Alternatively, first engagement portions and second engagement portions may be configured to include a first engagement portion and a second engagement portion engaging each other inside a through hole, and a first engagement portion and a second engagement portion engaging with each other outside a through hole via the through hole.

Furthermore, the insulator 6 is formed of the first insulator 10 and the second insulator 11, but the insulator 6 may be integrally formed with the stator core 5 by insert molding.

Moreover, in the above described embodiment, the first insulator 10 and the terminal block portion 12 are integrally formed by insert molding, but the terminal block portion 12 may be separately formed and attached to the first insulator 10. In addition, if necessary, it is acceptable that the connector housing 14 not be formed.

According to the present invention, a stator structure and a resolver of high reliability can be realized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A stator structure, comprising:
    a stator unit including: a stator core which has a first main body portion and a plurality of teeth portions extending at an inner peripheral side of the first main body portion and in which a plurality of through holes are formed to penetrate between two principal surfaces of the first main body; and a coil formed of a winding wire wound around each of the plurality of teeth portions via an insulator; and
    a first coil cover and a second coil cover that cover the coil in an axial direction of the stator core, wherein
    the first coil cover has a plurality of first protecting portions extending from a second main body portion and has a plurality of first engagement portions provided in the second main body portion,
the second coil cover has a plurality of second protecting portions extending from a second main body portion and has a plurality of second engagement portions provided in the second main body portion,
each of the plurality of first protecting portions and each of the plurality of second protecting portions are arranged between the plurality of teeth portions,
each of the plurality of first protecting portions and each of the plurality of second protecting portions that are arranged between a same pair of the plurality of teeth portions are in a non-restrained state where, in the axial direction, movement of the each of the plurality of second protecting portions and the each of the plurality of first protecting portions, are not respectively restrained,
distal end portions of the plurality of first protection portions and the plurality of second protection portions overlap in a radial direction of the stator core, and
the plurality of first engagement portions and the plurality of second engagement portions are engaged with each other through the plurality of through holes.

2. The stator structure according to claim 1, wherein the each of the plurality of first protecting portions and the each of the plurality of second protecting portions that are arranged between the same pair of the plurality of teeth portions are separated from each other.

3. The stator structure according to claim 1, wherein at the distal end portions of the plurality of first protection portions and the plurality of second protection portions, stepped portions forming steps facing each other in the radial direction of the stator core are formed.

4. The stator structure according to claim 1, wherein the plurality of first engagement portions and the plurality of second engagement portions are engaged with each other inside the plurality of through holes.

5. The stator structure according to claim 1, wherein the plurality of first protecting portion and the plurality of second protecting portion have inclined surfaces facing each other.

6. The stator structure according to claim 5, wherein the each of the plurality of first protecting portions and the each of the plurality of second protecting portions that are arranged between the same pair of the plurality of teeth portions are separated from each other.

7. A resolver comprising the stator structure according to claim 1.

* * * * *